(12) United States Patent
Fukui

(10) Patent No.: US 8,247,994 B2
(45) Date of Patent: Aug. 21, 2012

(54) LED ILLUMINATOR AND LED LAMP

(75) Inventor: Hiroyuki Fukui, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 304 days.

(21) Appl. No.: 12/696,244

(22) Filed: Jan. 29, 2010

(65) Prior Publication Data

US 2010/0219771 A1    Sep. 2, 2010

(30) Foreign Application Priority Data

Jan. 29, 2009  (JP) .................................. 2009-018352
Feb. 17, 2009  (JP) .................................. 2009-033429

(51) Int. Cl.
*H05B 37/02*     (2006.01)
(52) U.S. Cl. .................... 315/294; 315/226; 315/312
(58) Field of Classification Search .............. 315/209 R, 315/224–226, 287, 291, 294, 297, 307, 312
See application file for complete search history.

(56) References Cited

U.S. PATENT DOCUMENTS

| | | | |
|---|---|---|---|
| 6,621,235 B2* | 9/2003 | Chang | 315/216 |
| 7,598,679 B2* | 10/2009 | Lin et al. | 315/291 |
| 2006/0022607 A1* | 2/2006 | Hsu | 315/209 R |
| 2008/0048567 A1* | 2/2008 | Steele et al. | 315/151 |
| 2009/0015759 A1* | 1/2009 | Honbo | 349/69 |
| 2011/0187276 A1* | 8/2011 | Shteynberg et al. | 315/186 |
| 2012/0007521 A1* | 1/2012 | Otake et al. | 315/294 |

FOREIGN PATENT DOCUMENTS

JP       06-054289       7/1994

* cited by examiner

*Primary Examiner* — Tung X Le
(74) *Attorney, Agent, or Firm* — Hamre, Schumann, Mueller & Larson, P.C.

(57) ABSTRACT

An LED illuminator includes a light emission circuit and a driver. The light emission circuit includes an LED group and a connection line connecting the LED group. The driver drives the LED group by using an AC voltage inputted from outside. The driver includes a constant-current control circuit. The constant-current control circuit keeps the current flowing to the light emission circuit at a predetermined value.

13 Claims, 5 Drawing Sheets

LED ILLUMINATOR AND LED LAMP

BACKGROUND OF THE INVENTION

1. Field of the Invention

The present invention relates to an LED illuminator suitable for use as a substitute for an illuminator which utilizes a fluorescent lamp. The present invention further relates to an LED lamp which is usable as a substitute for a fluorescent lamp.

2. Description of the Related Art

Conventionally, illumination apparatuses utilizing a fluorescent lamp have been in wide use. Meanwhile, as disclosed in e.g. JP-UM-A-6-54289, illuminators which utilize a light emitting diode (LED) instead of a fluorescent lamp have been developed. An LED has the advantage over a fluorescent lamp in terms of the smaller power consumption and longer life.

FIG. 5 is a wiring diagram showing the conventional LED illuminator disclosed in the above-described gazette. The LED illuminator X illustrated in the figure can be used as mounted to a conventional fluorescent lamp illumination apparatus. In the LED illuminator X, electric power supplied from a commercial 100V AC power supply is reduced by a transformer 91 and then converted into a DC voltage by a rectifier 92 and a capacitor 93. The DC voltage is then applied to a plurality of LEDs 95 via a resistor 94, whereby each of the LEDs 95 is turned on.

Generally, fluorescent lamp illumination apparatuses are designed to input AC current to a fluorescent lamp and generate a high voltage to start discharge. The fluorescent lamp illumination apparatuses include a stabilizer for stabilizing the current to be inputted to a fluorescent lamp after the discharge is started. Fluorescent lamp illumination apparatuses are classified into a starter type, a rapid start type, an inverter type and so on according to the method for lighting a fluorescent lamp. Even if the illumination apparatuses have the same rated voltage, the voltage, current and frequency outputted from the stabilizer vary depending on the lighting method. Moreover, even if the same lighting method is employed, the characteristics of the stabilizer can vary depending on the kind of the fluorescent lamp illumination apparatus.

Thus, to use the LED illuminator X in a conventional fluorescent lamp illumination apparatus, it is necessary to take into consideration the power consumption or the like and adjust the number of series connections and parallel connections of the plurality of LEDs 95 in accordance with the lighting method. Moreover, in the LED illuminator X, the current flowing to each LED 95 tends to vary, resulting in unstable light emission.

SUMMARY OF THE INVENTION

The present invention is proposed under the above-described circumstances. It is therefore an object of the present invention to provide an LED illuminator which is capable of achieving stable light emission regardless of the kind of the fluorescent lamp illumination apparatus.

According to a first aspect of the present invention, there is provided an LED illuminator. The LED illuminator includes a light emission circuit including an LED group and a connection line connecting the LED group; a driver for driving the LED group by using an AC voltage inputted from outside. The driver includes a constant-current control circuit.

Preferably, the driver includes a first switch element for switching whether to supply or not to supply a voltage for bringing the LED group into a light-on state to the light emission circuit. The constant-current control circuit keeps current flowing to the light emission circuit at a predetermined value when the first switch element is in an on state.

Preferably, the driver includes a first voltage conversion circuit that includes a second switch element and that performs alternate switching between an on state and an off state of the second switch element to generate, from the AC voltage, a DC voltage for bringing the LED group into the light-on state. The constant-current control circuit controls the on/off state of the second switch element to keep current flowing to the light emission circuit at a predetermined value when the LED group is in the light-on state.

Preferably, the driver includes a PWM control circuit for performing PWM control of an on/off state of the first switch element, and a second voltage conversion circuit for converting the DC voltage into a predetermined voltage for supply to the PWM control circuit as a power supply voltage.

Preferably, the LED group includes a plurality of LED rows connected in parallel with each other, and each of the LED rows includes a plurality of LEDs.

Preferably, the LED illuminator further includes an additional light emission circuit provided in parallel with the light emission circuit, and an additional constant-current control circuit for keeping current flowing to the additional light emission circuit at a predetermined value.

Preferably, the additional light emission circuit includes a plurality of additional LED rows connected in parallel with each other. Each of the additional LED rows consists solely of a plurality of additional LEDs and an additional connection line.

Preferably, the additional constant-current control circuit controls the on/off state of the second switch element.

According to a second aspect of the present invention, there is provided an LED illuminator. The LED illuminator includes an LED lamp, and a fluorescent lamp illumination apparatus that can be used to light a fluorescent lamp. The LED lamp includes a voltage conversion circuit for converting an AC voltage from outside into a lower AC voltage; a rectifier circuit for converting the AC voltage from the voltage conversion circuit into a DC voltage; a light emission circuit including an LED group driven by the DC voltage from the rectifier circuit and a connection line connecting the LED group; and a constant-current circuit which is connected in series with the light emission circuit and through which a constant current flows.

Preferably, the constant-current circuit includes a three-terminal regulator.

Preferably, the light emission circuit includes an input through which the DC voltage from the rectifier circuit is inputted, and an output positioned on an opposite side of the input across the LED group. The light emission circuit consists solely of the LED group and the connection line between the input and the output.

Preferably, the LED group comprises a plurality of LED rows connected in parallel with each other. Each of the LED rows includes a plurality of LEDs connected in series with each other.

Preferably, the LED illuminator further includes an additional LED lamp. The additional LED lamp includes an additional voltage conversion circuit for converting an AC voltage from outside into a lower AC voltage; an additional rectifier circuit for converting the AC voltage from the additional voltage conversion circuit into a DC voltage; an additional light emission circuit including an additional LED group driven by the DC voltage from the additional rectifier circuit and an additional connection line connecting the additional LED group; an additional constant-current circuit which is connected in series with the additional light emission circuit and through which a constant current flows.

Preferably, the additional constant-current circuit includes an additional three-terminal regulator.

Preferably, the additional light emission circuit includes an additional input through which the DC voltage from the additional rectifier circuit is inputted, and an additional output positioned on an opposite side of the additional input across the additional LED group. The additional light emission circuit consists solely of the additional LED group and the additional connection line between the additional input and the additional output.

Preferably, the additional LED group includes a plurality of additional LED rows connected in parallel with each other. Each of the additional LED rows includes a plurality of additional LEDs connected in series with each other.

According to a third aspect of the present invention, there is provided an LED lamp. The LED lamp includes a voltage conversion circuit for converting an AC voltage from outside into a lower AC voltage; a rectifier circuit for converting the AC voltage from the voltage conversion circuit into a DC voltage; a light emission circuit including an LED group driven by the DC voltage from the rectifier circuit, and a connection line connecting the LED group; and a constant-current circuit which is connected in series with the light emission circuit and through which a constant current flows.

Preferably, the constant-current circuit includes a three-terminal regulator.

Preferably, the light emission circuit includes an input through which the DC voltage from the rectifier circuit is inputted, and an output positioned on an opposite side of the input across the LED group. The light emission circuit consists solely of the LED group and the connection line between the input and the output.

Preferably, the LED group includes a plurality of LED rows connected in parallel with each other. Each of the LED rows includes a plurality of LEDs connected in series with each other.

Owing to the constant-current control circuit, the LED illuminator and LED lamp of the present invention keep the current flowing to the plurality of LEDs constant, regardless of the magnitude of the AC voltage from the outside. The AC voltage from the outside can be obtained from e.g. a general fluorescent lamp illumination apparatus. The above-described LED illuminator ensures that a constant current flows to the plurality of LEDs regardless of the kind of the general fluorescent lamp illumination apparatus. Thus, with the LED illuminator, it is not necessary to change the arrangement of the LEDs in accordance with the kind of the general fluorescent lamp illumination apparatus, which leads to a reduction in cost. Moreover, since the current flowing to the LEDs is constant, the light emission of the LEDs is stable.

DETAILED DESCRIPTION OF THE PREFERRED EMBODIMENTS

Figure 1:
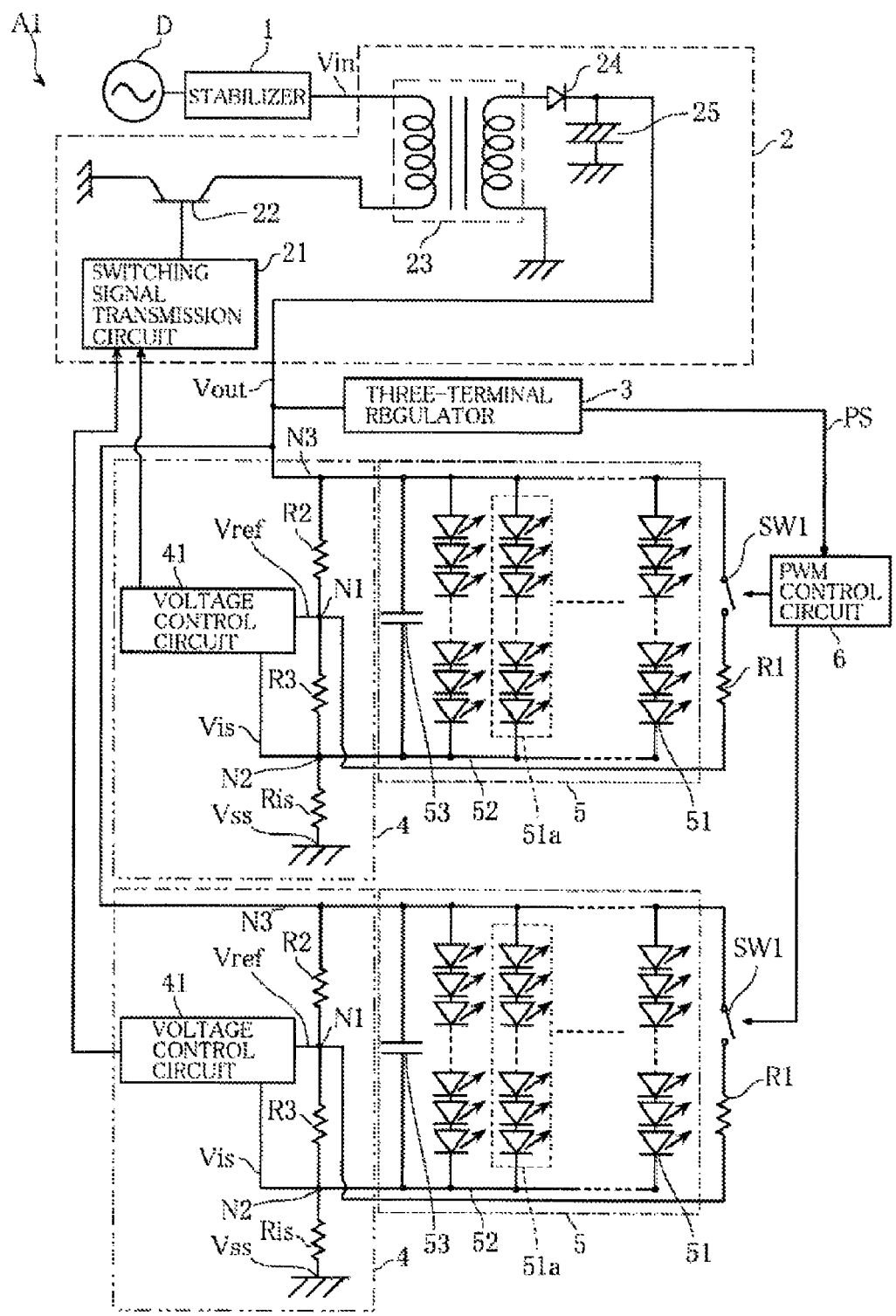
FIG. 1 is a block diagram illustrating an LED illuminator according to a first embodiment of the present invention.

FIG. 1 is a functional block diagram illustrating a first embodiment of an LED illuminator according to the present invention. The LED illuminator A1 illustrated in FIG. 1 includes a stabilizer 1 connected to an AC power supply D, a voltage conversion circuit 2, a three-terminal regulator 3, a pair of constant-current control circuits 4, a pair of light emission circuits 5, a PWM control circuit 6, a switch element SW1 and a resistor R1. The driver of the present invention is made up of the voltage conversion circuit 2, the three-terminal regulator 3, the paired light emission circuits 5, the PWM control circuit 6, the switch element SW1 and the resistor R1. The driver drives the paired light emission circuits 5 by using the AC current inputted from the stabilizer 1.

The AC power supply D is a commercial 100V power supply. The stabilizer 1 is of the type incorporated in such a general fluorescent lamp illumination apparatus as described above. The stabilizer 1 supplies an AC voltage Vin to the voltage conversion circuit 2.

The voltage conversion circuit 2 includes a switching signal transmission circuit 21, a transistor 22, a transformer 23, a diode 24 and a capacitor 25. The switching signal transmission circuit 21 is e.g. a photocoupler and transmits a switching signal, which is described later, to a control electrode of the transistor 22. The voltage conversion circuit 2 controls the on/off state of the transistor 22 to generate a DC voltage Vout from the AC voltage Vin. The Vout is the voltage for bringing a plurality of LEDs 51 into a light-on state in the present invention. The transistor 22 is the second switch element of the present invention.

The three-terminal regulator 3 converts the DC voltage Vout generated by the voltage conversion circuit 2 into a predetermined value of voltage and supplies the voltage to the PWM control circuit 6 as a power supply voltage PS. It is to be noted that, whether the DC voltage Vout is a voltage Von or a voltage Voff, which is described later, the three-terminal regulator 3 converts the voltage Von and the voltage Voff into a predetermined value of voltage and supplies the voltage to the PWM control circuit 6 as a power supply voltage PS.

Each of the paired constant-current control circuits 4 includes resistors R2 and R3, a current setting resistor Ris, and a voltage control circuit 41. The paired constant-current control circuits 4 are connected to the paired light emission circuits 5, respectively.

The voltage control circuit 41 outputs a switching signal to the transistor 22 via the switching signal transmission circuit 21 based on a voltage Vref at the connection node N1 of the resistors R2 and R3 and a voltage Vis at the connection node N2 of the resistor R3 and the current setting resistor Ris. In this way, the voltage control circuit controls the on/off state of the transistor 22.

In each of the constant-current control circuits 4, the resistor R2 is connected in parallel with the series circuit composed of the switch element SW1 and the resistor R1. The resistor R3 is connected in series with the resistor R2. The resistor R3 is connected in series with the series circuit composed of the switch element SW1 and the resistor R1. The current setting resistor Ris is connected between the resistor R3 and the ground voltage node Vss to which a ground voltage is supplied. The series circuit composed of the resistor R2 and the resistor R3 is connected in parallel with the light emission circuit 5. The DC voltage Vout generated in the voltage conversion circuit 2 is supplied to the connection node N3 of the light emission circuits 5, the series circuit composed of the switch element SW1 and the resistor R1, and the resistor 2.

Each of the paired light emission circuits 5 includes a plurality of LEDs 51 arranged on a non-illustrated board, a connection line 52 connecting the LEDs 51, and a capacitor 53. In the light emission circuit 5, the plurality of LEDs 51 are arranged to form twelve LED rows 51a which are arranged in parallel and each of which is made up of twelve LEDs 51 arranged in series. No resistor is provided in the light emission circuits 5, and the LED rows 51a are connected by the connection line 52.

Each of the switch elements SW1 is e.g. a bipolar transistor, a MOS transistor, a relay, a photocoupler or a thyristor. The resistor R1 is arranged in series with the switch element SW1.

The PWM control circuit 6 is e.g. a microcomputer. The PWM control circuit 6 outputs a PWM control signal to the switch elements SW1 to perform PWM control of the on/off state of the switch elements SW1. The PWM control circuit 6 determines the duty of the PWM control signal based on the detection by a non-illustrated infrared sensor, human sensor or photosensor, or the volume control or the remote controller operation or the like by the operator. Instead of the PWM control circuit 6, a circuit such as a timer IC which outputs a logic high level signal or a logic low level signal may be used.

Based on the PWM control signal outputted from the PWM control circuit 6, the switch elements SW1 switch to allow the supply of the DC voltage Vout to the paired light emission circuits 5 or not to allow the supply of the DC voltage to the circuits. Further, when the plurality of LEDs 51 are on, the paired constant-current control circuits 4 control the on/off state of the transistor 22 to keep the current flowing to each light emission circuit 5 at a predetermined value.

The operation of the LED illuminator A1 are described below in more detail.

Figure 2:
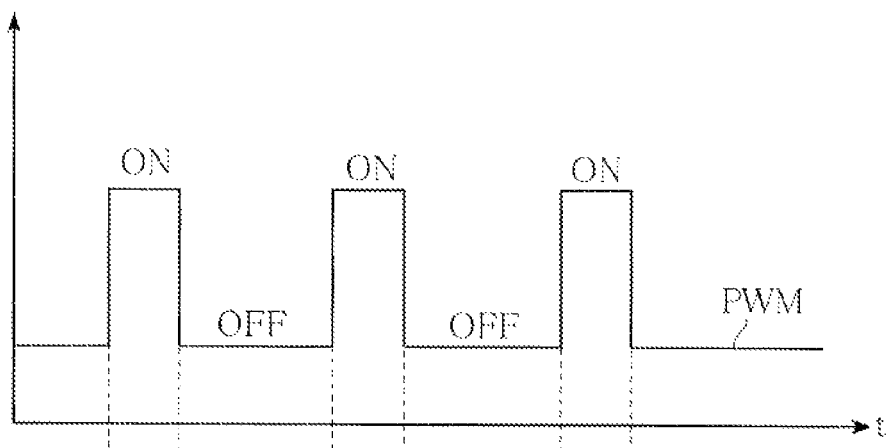
FIG. 2 illustrates a PWM control signal (a) and a voltage (b) to be supplied to each LED in the LED illuminator of FIG. 1.
Figure 2:
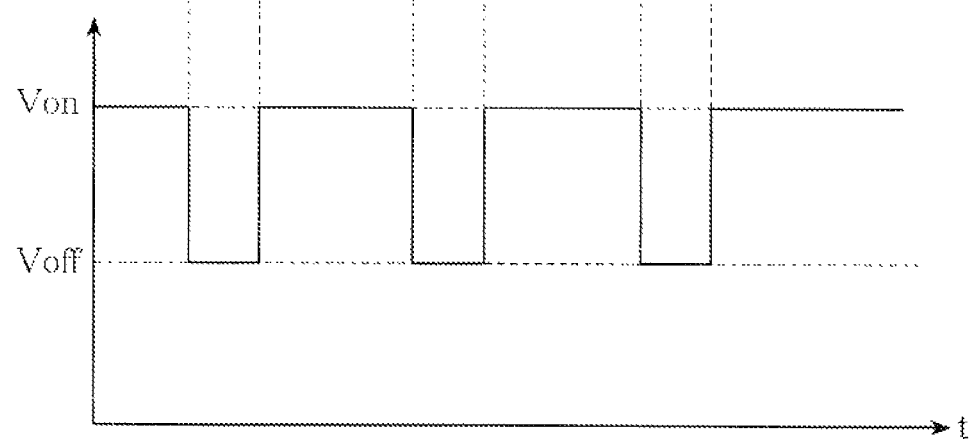

FIG. 2(a) illustrates a PWM control signal in the PWM control circuit 6. FIG. 2(b) illustrates a voltage to be supplied to the light emission circuit 5.

When the PWM control signal is at a logic high level, voltage Voff is supplied to the anodes of the LEDs 51, so that the LEDs 51 become the light-off state.

Herein, the resistances of the resistors R1, R2 and R3 are set sufficiently higher than the resistance of the current setting resistor Ris. When the resistances of the resistors R1, R2 and R3 are represented by R1, R2 and R3, respectively, the voltage Voff is expressed by the formula below:

$$V\text{off} \approx ((R2 \times R3/(R1 \times (R2+R3)))+1) \times V\text{ref}$$

When the PWM control signal is at a logic low level, voltage Von is supplied to the anodes of the LEDs 51, so that the LEDs 51 become the light-on state.

When the resistances of the resistors R1, R2 and R3 are set sufficiently higher than the resistance of the current setting resistor Ris as noted before, the voltage Von is expressed by the formula below:

$$V\text{on} \approx (R2/R1+1) \times V\text{ref}$$

The voltage Von is controlled to be not lower than the sum of the forward voltages of six LEDs 51 arranged in series in the LED-row 51a. The voltage Voff is controlled to be lower than the sum of the forward voltages of six LEDs 51 arranged in series in the LED-row 51a. For instance, to reliably turn off the LEDs 51, the voltage Voff is controlled to be lower than the sum of the forward voltages of six LEDs 51 arranged in series in the LED-row 51a by a predetermined value.

The voltage control circuit 41 controls the on/off state of the transistor 22 to make the voltage Vref at the connection node N1 be a predetermined voltage V1. This arrangement ensures that the voltage Von and the voltage Voff are kept at respective predetermined values, so that the control of the light-on state and light-off state of the LEDs 51 is stably performed. The voltage control circuit 41 further controls the on/off state of the transistor 22 to make the voltage Vis at the connection node N2 be a predetermined voltage V2 which is lower than the predetermined voltage V1. With this arrangement, the current which flows to the light emission circuit 5 when the LEDs 51 are in the light-on state is kept constant. The constant current to flow to each of the light emission circuits 5 is e.g. 360 mA.

Herein, the frequency of the PWM control signal is set to e.g. not lower than 50 Hz.

The advantages of the LED illuminator A1 having the above-described structure are described below.

In the LED illuminator A1, the voltage Von and the voltage Voff are so controlled that a constant current flows to the light emission circuit 5 when the LEDs 51 are in the light-on state, regardless of the magnitude of the AC voltage Vin from the stabilizer 1. Thus, with the arrangement of the LED illuminator A1, the light emission circuits 5 of the same standard can be lit properly in any kind of general fluorescent lamp illumination apparatus. Thus, in the LED illuminator A1, the light emission circuit 5 can be standardized, which leads to a reduction in cost.

In this embodiment, since constant current flows to the light emission circuit 5 when the LEDs 51 are in the light-on state, the light emission of the LEDs 51 is uniform. Moreover, since the frequency of the PWM control signal is set to e.g. not lower than 50 Hz, the light emitted from the LEDs 51 does not cause people to feel a flicker. Thus, the LED illuminator A1 provides desirable illumination free from a flicker.

In this embodiment, since the light emission circuit 5 is separated from the AC power supply D by the transformer 23, touching the LEDs 51 does not cause an electric shock. Thus, the LED illuminator A1 is superior in terms of safety.

In this embodiment, the power supply voltage PS of the PWM control circuit 6 is generated from the DC voltage Vout by using the three-terminal regulator 3. In this way, the power supply of the PWM control circuit 6 is also supplied from the voltage conversion circuit 2, so that it is possible to reduce the circuit scale in the LED illuminator A1.

Figure 3:
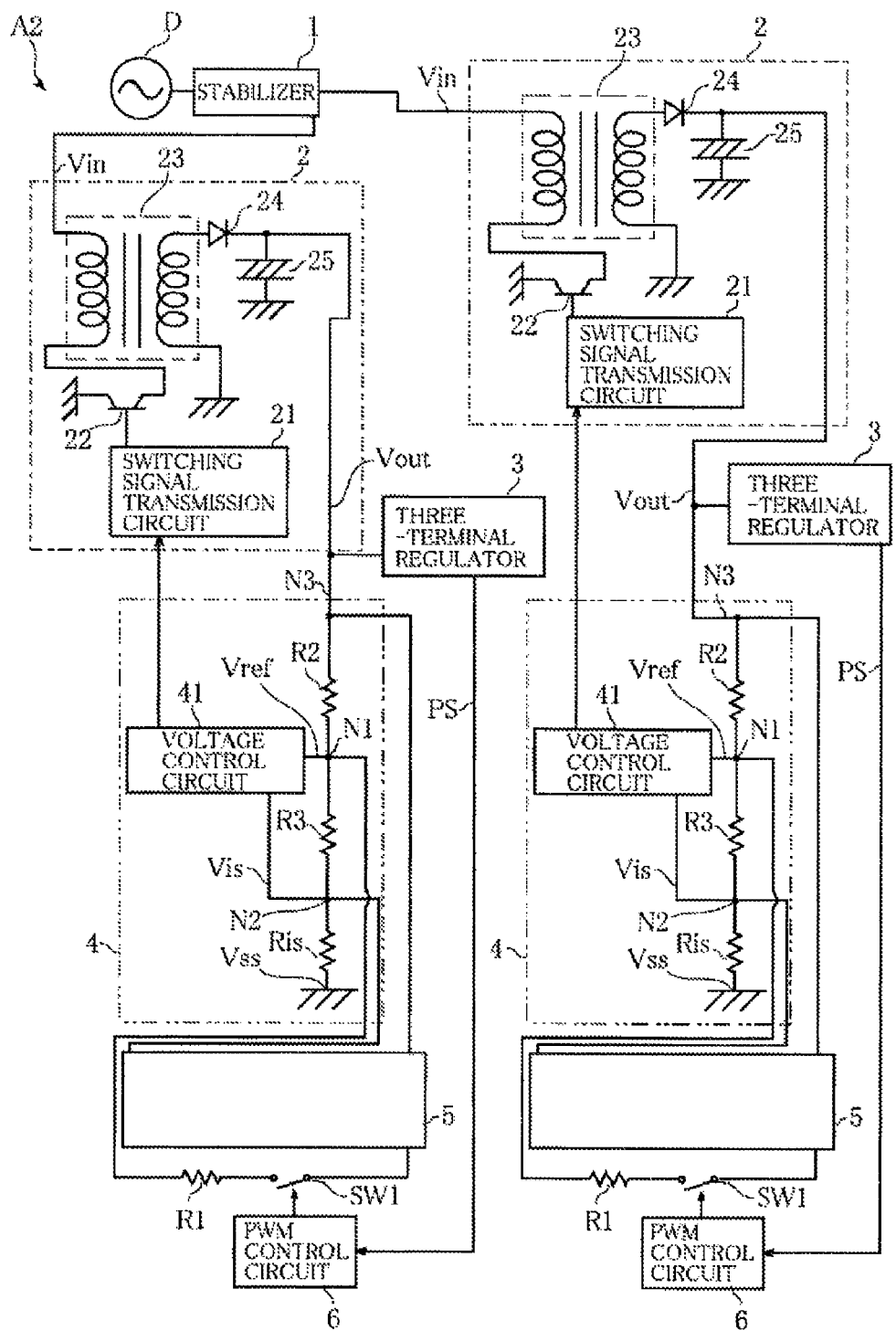
FIG. 3 is a block diagram illustrating an LED illuminator according to a second embodiment of the present invention.

FIG. 3 is a functional block diagram illustrating a second embodiment of an LED illuminator according to the present invention. In FIG. 3, the elements which are identical or similar to those of the foregoing embodiment are designated by the same reference signs as those used for the foregoing embodiment, and the description is appropriately omitted. The LED illuminator A2 illustrated in FIG. 3 includes a pair of voltage conversion circuits 2 connected to the stabilizer 1. To each of the voltage conversion circuits 2, a constant-current control circuit 4 is connected. The illustration of the internal structure of the paired light emission circuits 5 is omitted in FIG. 3.

The LED illuminator A2 having this structure is capable of reducing the load on the transistor 22 and increasing the life of the circuit.

The LED illuminator according to the present invention is not limited to the foregoing embodiments. The specific structure of each part of the LED illuminator of the present invention may be varied in design in various ways. For instance, although two light emission circuits 5 are arranged in parallel in the foregoing embodiments, only one light emission circuit may be provided or three or more light emission circuits may be arranged in parallel.

Although the LED illuminator A1 of the foregoing embodiments includes the stabilizer 1, the illuminator can be used as directly connected to the DC power supply D without using the stabilizer 1. In this case, it is preferable that the voltage of the AC power supply D is 100 to 240 V.

The illuminator of the foregoing embodiments is so designed that Vout becomes Voff when the switch element SW1 is in the on state. However, the illuminator may be so designed that Vout becomes Von when the switch element SW1 is in the on state.

Figure 4:
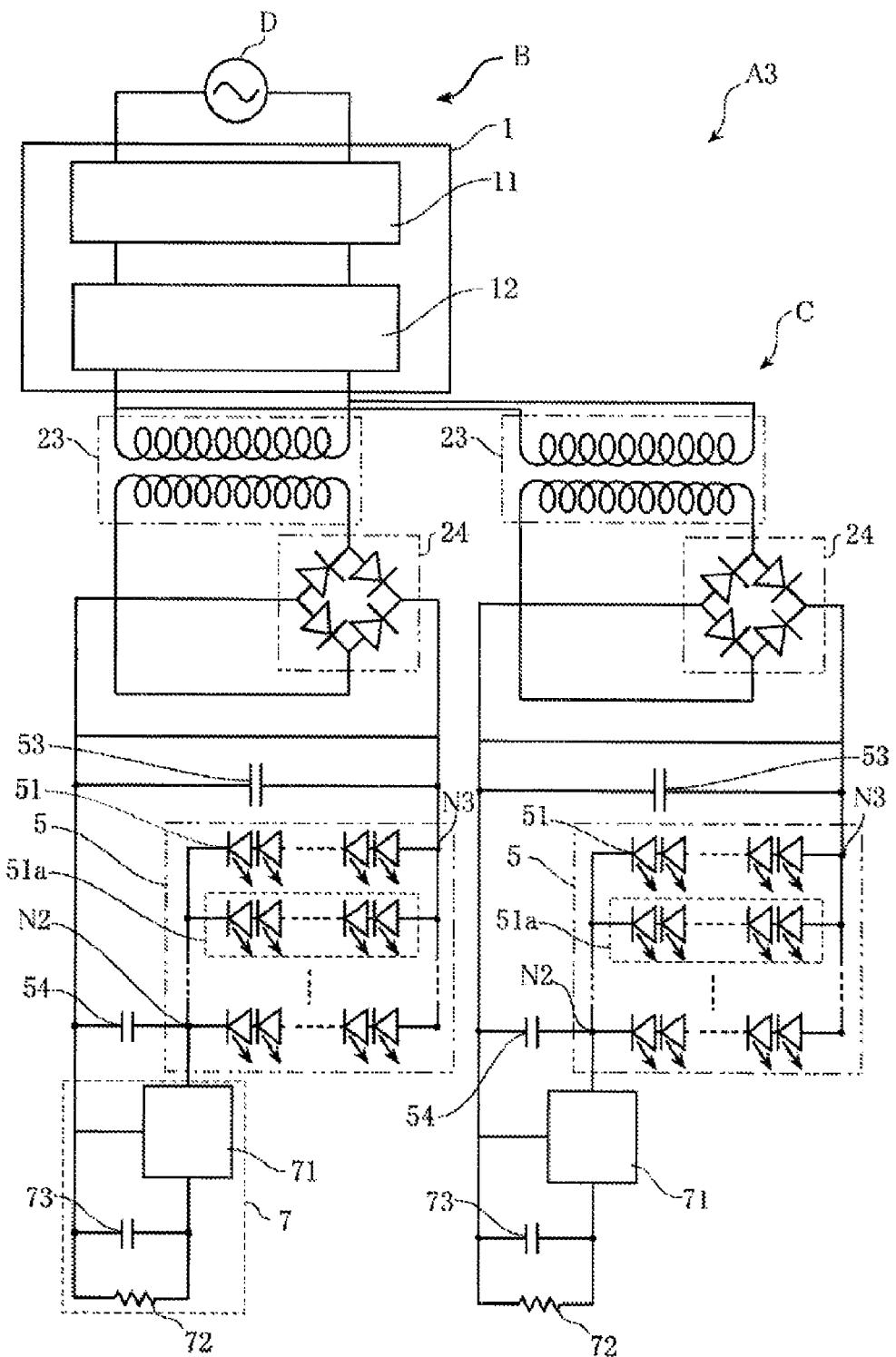
FIG. 4 is a block diagram illustrating an LED illuminator according to a third embodiment of the present invention.
Figure 5:
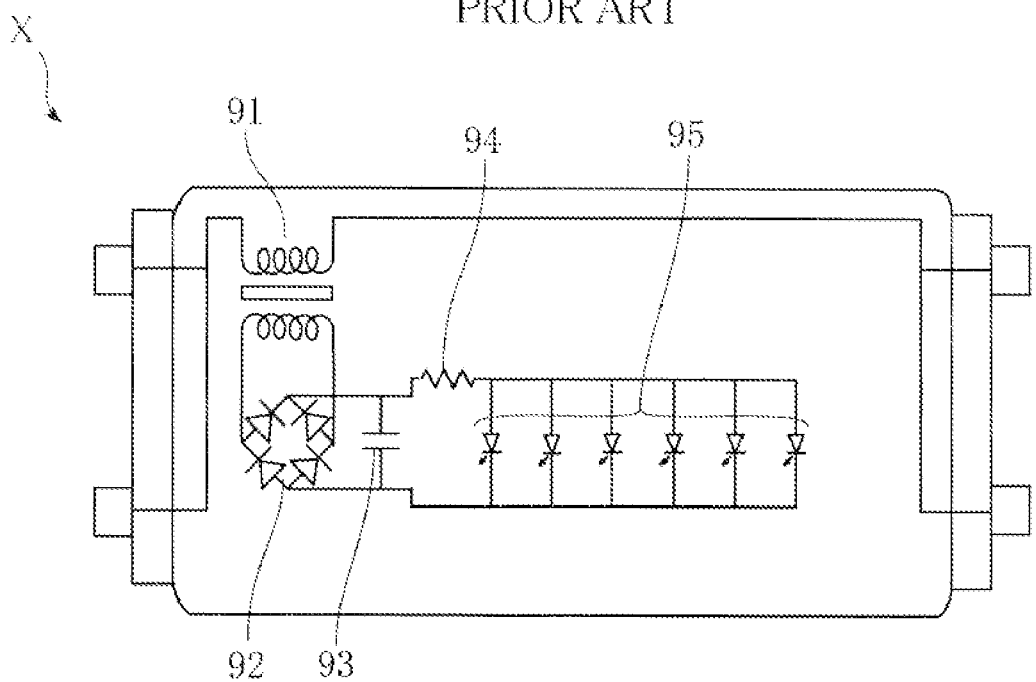
FIG. 5 illustrates an example of conventional LED illuminator.

FIG. 4 is a block diagram illustrating an LED illuminator according to a third embodiment of the present invention. The LED illuminator A3 illustrated in FIG. 4 is made up of a general fluorescent lamp illumination apparatus B and an LED lamp C attached to the general fluorescent lamp illumination apparatus B. The LED lamp C includes two non-illustrated cylindrical cases. Each of the cylindrical cases houses a voltage conversion circuit 23, a rectifier circuit 24, capacitors 53, 54, 73, a light emission circuit 5, a three-terminal regulator 71 and a resistor 72. The general fluorescent lamp illumination apparatus B is an apparatus originally designed to supply voltage to a fluorescent lamp and includes an AC power supply D and a stabilizer 1. The AC power supply D is a commercial 100V power supply. The stabilizer 1 includes a rectifier 11, an inverter 12, and a non-illustrated electronic circuit to control voltage to turn on a fluorescent lamp. The inverter 12 is designed to supply an AC voltage having a frequency of 70 to 80 kHz to suppress flicker of a fluorescent lamp. The inverter 12 supplies an AC voltage of about 100V to each of the voltage conversion circuits 23. However, this AC voltage varies depending on the maker of the inverter 12.

The voltage conversion circuit 23 is a transformer and reduces the AC voltage from the inverter 12 to about 30V.

The rectifier circuit 24 is a diode bridge and converts the AC voltage from the voltage conversion circuit 23 to a DC voltage.

The capacitor 53 is provided to remove unnecessary oscillation from the voltage waveform of the DC voltage from the rectifier circuit 24 to make the waveform smooth.

Each of the light emission circuits 5 includes twelve LED rows 51a each of which consists of twelve light emitting diodes (LED) 51 arranged in series. The twelve LED rows 4A are arranged in parallel with each other. The light emission circuit 5 further includes an input N3 through which the DC voltage from the rectifier circuit 24 is inputted, and an output N2 positioned on the opposite side of the input N3 across the twelve LED rows 51a. The output N2 is connected to the three-terminal regulator 71. The light emission circuit 5 is made up of the LEDs 51 and a connection line connecting the LEDs, and between the input N3 and the output N2, no resistor is in series with the LEDs 51.

The three-terminal regulator 71, the resistor 72 and the capacitor 73 constitute a constant-current circuit 7. Owing to the three-terminal regulator 71, the voltage applied to the constant-current circuit 7 is made constant. The value of the current which flows through the constant-current circuit 7 depends on the magnitude of the resistor 72. Since the resistor 72 is a fixed resistor and the voltage to be applied to the constant-current circuit 7 is constant, the current which flows through the constant-current circuit 7 is constant. The constant-current circuit 7 is connected in series with the light emission circuit 5.

The capacitor 54 is arranged in series with the light emission circuit 5 and in parallel with the constant-current circuit 7.

The advantages of the LED lamp C having the above-described structure are described below.

In the LED lamp C, since the constant-current circuit 7 is connected in series with the light emission circuit 5, constant current flows to the light emission circuit 5 regardless of the magnitude of the voltage applied to the light emission circuit 5. Thus, with the arrangement of the LED lamp C, it is not necessary, in making the light emission circuit 5, to examine the number of series connections and parallel connections of the LEDs 51 in relation to the output voltage of the inverter 12 of each maker and consider the power consumption. Thus, the light emission circuit 5 of the LED lamp C can be manufactured with the same standard, which leads to a reduction in cost.

Moreover, in the LED lamp C, the LEDs 51 operate stably because the current flowing to the light emission circuit 5 is constant regardless of the input voltage. Thus, flicker is suppressed in the LED lamp C.

Since the AC voltage from the inverter 12 is reduced by the voltage conversion circuit 23 in this embodiment, the LED lamp of this embodiment is less influenced by the difference in output voltage from the inverters 12 of different makers. Moreover, when the voltage conversion circuit 23 is an insulating transformer, touching the LEDs 51 does not cause an electric shock. Thus, the LED lamp C is safe.

The LED lamp C according to the present invention is not limited to the foregoing embodiment. The specific structure of each part of the LED lamp of the present invention may be varied in design in various ways. For instance, although two light emission circuits 5 and so on are arranged in parallel in the foregoing embodiment, only one light emission circuit may be provided or three or more light emission circuits may be arranged in parallel.

The LED lamp according to the present invention can be used in combination with any kind of existing general fluorescent lamp illumination apparatus and is useful as a substitute for a fluorescent lamp.

The invention claimed is:

1. An LED illuminator comprising:
   a light emission circuit including an LED group and a connection line connecting the LED group; and
   a driver for driving the LED group by using an AC voltage inputted from outside;
   the driver including a constant-current control circuit,
   wherein the driver includes a first switch element for switching whether to supply or not to supply a voltage for bringing the LED group into a light-on state to the light emission circuit,
   the constant-current control circuit keeps current flowing to the light emission circuit at a predetermined value when the first switch element is in an on state,
   the driver includes a first voltage conversion circuit that includes a second switch element and that performs alternate switching between an on state and an off state of the second switch element to generate, from the AC voltage, a DC voltage for bringing the LED group into the light-on state, and
   the constant-current control circuit controls the on/off state of the second switch element to keep current flowing to the light emission circuit at a predetermined value when the LED group is in the light-on state.

2. The LED illuminator according to claim 1, wherein the driver includes a PWM control circuit for performing PWM control of an on/off state of the first switch element, and a second voltage conversion circuit for converting the DC voltage into a predetermined voltage for supply to the PWM control circuit as a power supply voltage.

3. The LED illuminator according to claim 1, wherein the LED group includes a plurality of LED rows connected in parallel with each other, each of the LED rows comprising a plurality of LEDs.

4. The LED illuminator according to claim 1, further comprising an additional light emission circuit provided in parallel with the light emission circuit, and an additional constant-current control circuit for keeping current flowing to the additional light emission circuit at a predetermined value.

5. The LED illuminator according to claim 4, wherein the additional light emission circuit includes a plurality of additional LED rows connected in parallel with each other, each of the additional LED rows consisting solely of a plurality of additional LEDs and an additional connection line.

6. The LED illuminator according to claim 4, wherein the additional constant-current control circuit controls the on/off state of the second switch element.

7. An LED illuminator comprising:
a first LED lamp; and
a fluorescent lamp illumination apparatus that is configured to light a fluorescent lamp;
the first LED lamp comprising:
a first voltage conversion circuit for converting an AC voltage from outside into a lower AC voltage;
a first rectifier circuit for converting the AC voltage from the first voltage conversion circuit into a DC voltage;
a first light emission circuit including a first LED group driven by the DC voltage from the first rectifier circuit, and a first connection line connecting the first LED group; and
a first constant-current circuit which is connected in series with the first light emission circuit and through which a constant current flows,
the LED illuminator further comprising a second LED lamp, the second LED lamp including:
a second voltage conversion circuit for converting an AC voltage from outside into a lower AC voltage;
a second rectifier circuit for converting the AC voltage from the second voltage conversion circuit into a DC voltage;
a second light emission circuit including a second LED group driven by the DC voltage from the second rectifier circuit and a second connection line connecting the second LED group; and
a second constant-current circuit which is connected in series with the second light emission circuit and through which a constant current flows.

8. The LED illuminator according to claim 7, wherein the first constant-current circuit includes a three-terminal regulator.

9. The LED illuminator according to claim 7, wherein: the first light emission circuit includes a first input through which the DC voltage from the first rectifier circuit is inputted, and a first output positioned on an opposite side of the first input across the first LED group; and
the first light emission circuit consists solely of the first LED group and the first connection line between the first input and the first output.

10. The LED illuminator according to claim 7, wherein the first LED group comprises a plurality of LED rows connected in parallel with each other, each of the LED rows comprising a plurality of LEDs connected in series with each other.

11. The LED illuminator according to claim 7, wherein the second constant-current circuit includes three-terminal regulator.

12. The LED illuminator according to claim 7, wherein: the second light emission circuit includes a second input through which the DC voltage from the second rectifier circuit is inputted, and a second output positioned on an opposite side of the second input across the second LED group;
the second light emission circuit consists solely of the second LED group and the second connection line between the second input and the second output.

13. The LED illuminator according to claim 7, wherein the second LED group comprises a plurality of additional LED rows connected in parallel with each other, each of the additional LED rows comprising a plurality of additional LEDs connected in series with each other.

* * * * *